Patented Oct. 6, 1942

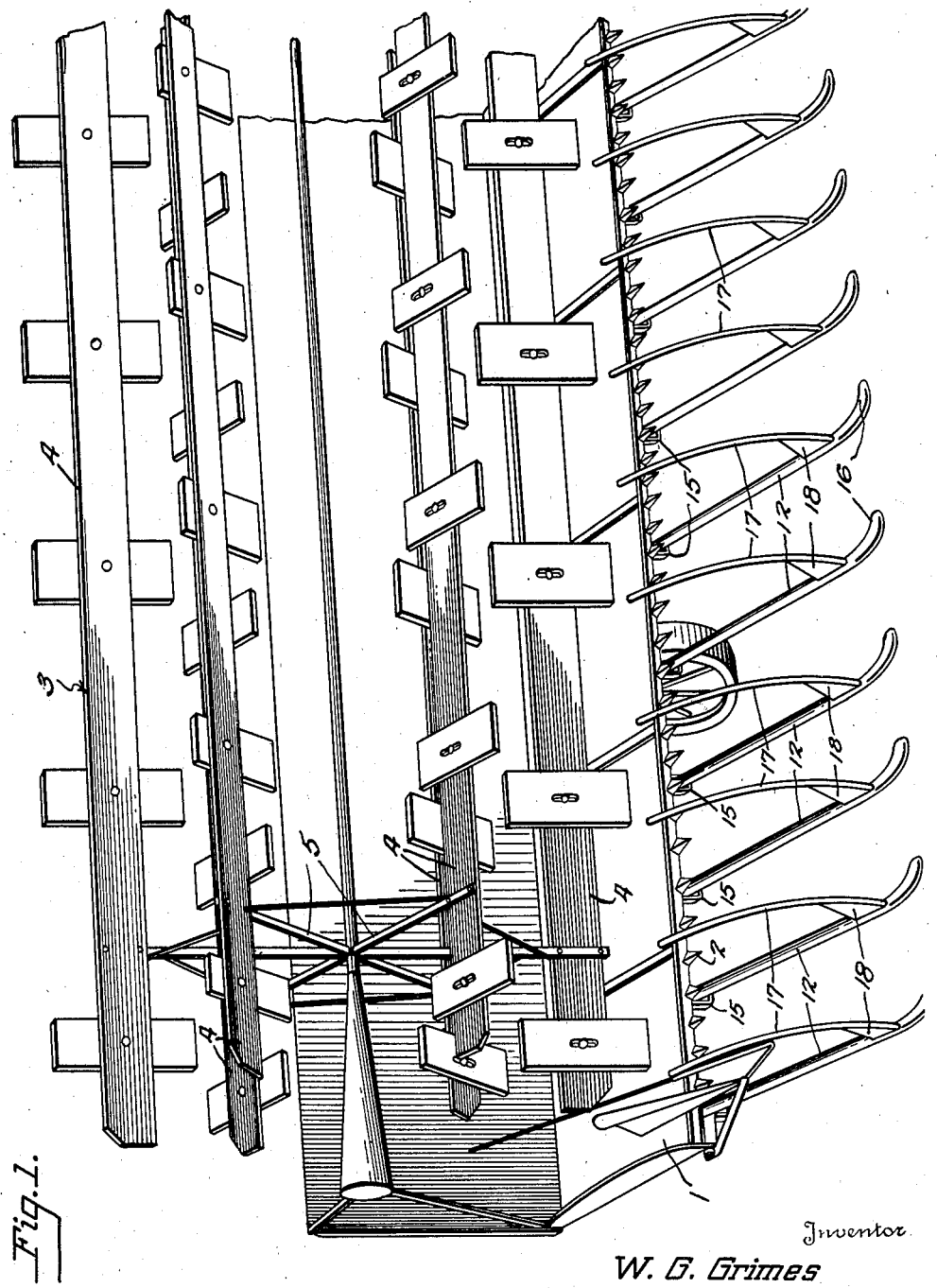

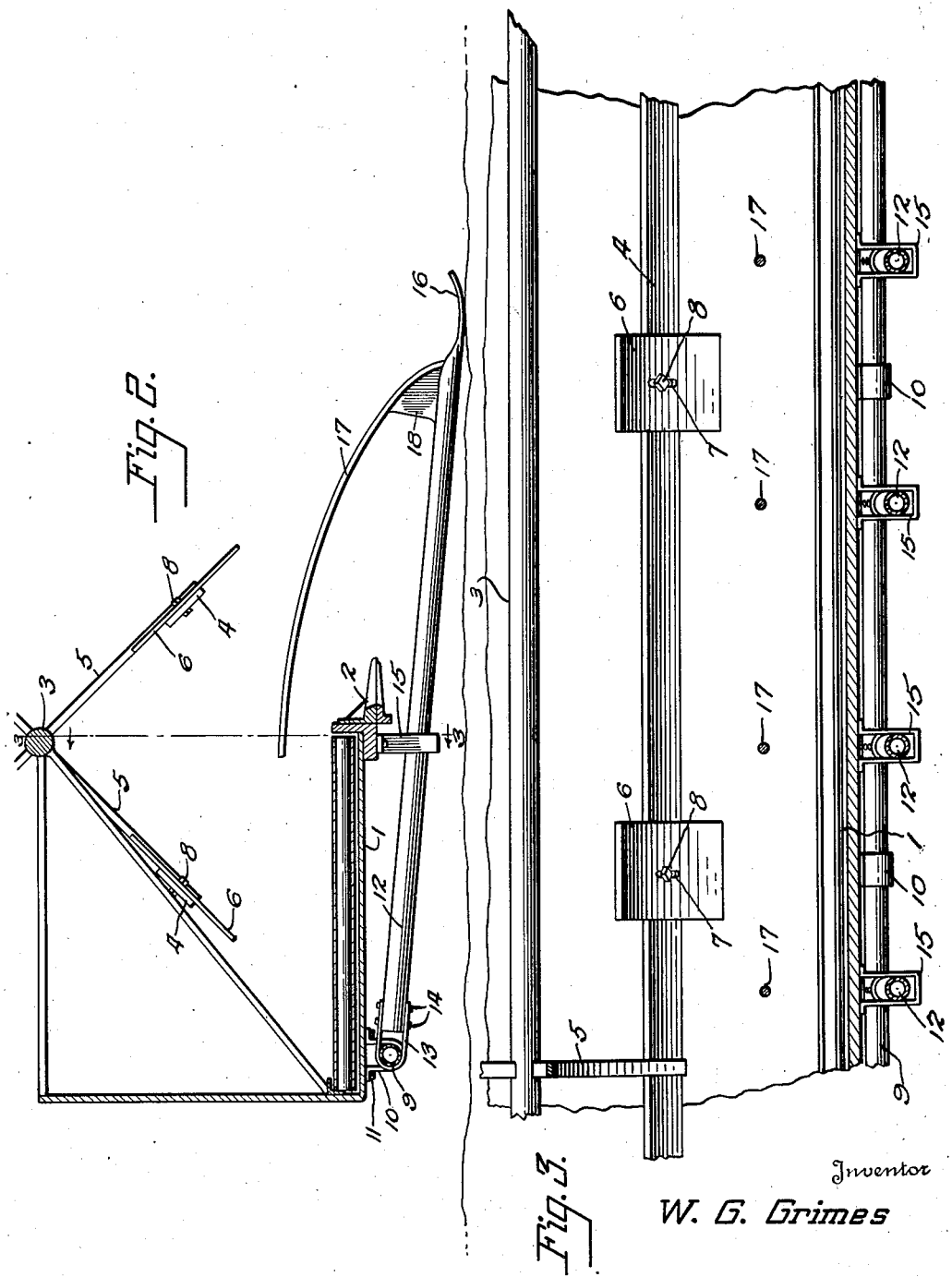

2,298,121

UNITED STATES PATENT OFFICE 2,298,121

HARVESTING MACHINE

Walter G. Grimes, Pratt, Kans.

Application February 7, 1942, Serial No. 429,917

3 Claims. (Cl. 56—312)

This invention relates to harvesters and more particularly to an attachment for harvesters which permits the effective handling of crops blown down by wind and storm and thereby rendered impractical for ordinary harvesting.

It has been proposed heretofore to apply guide devices with a view to lifting such wind-swept plants but such devices have proven ineffective due to inequalities and irregularities in the ground and the posture of the plants.

The object of the present invention is to provide an attachment including ground-contacting runners having a maximum radius for rocking and entire freedom so that the guide or runner part will constantly contact the ground, but remain free at all times to oscillate in a vertical plane, thus assuring the uniform picking up and guiding of the fallen plants to the sickle bar.

The invention consists in the novel construction, arrangement and combinations of parts hereinafter more particularly described and claimed.

Two sheets of drawings accompany this specification as part thereof in which like reference characters indicate like parts throughout:

Figure 1 is a fragmentary vertical perspective of a front corner of a harvester with the present invention applied;

Figure 2 is a fragmentary vertical cross section through a portion of a reel and the platform of a harvester with the improved device applied; and Figure 3 is a fragmentary vertical cross section taken on line 3—3 of Figure 2.

The present invention is in the nature of attachments for a standard harvester which includes a platform 1, sickle bar 2 and reel 3, the latter constructed as usual with a central shaft and radially disposed arms 5 carrying slats 4 parallel with the shaft.

In accordance with the present invention a plurality of U-shaped stirrup members 10 are secured as by bolts 11 to the underface of platform 1 adjacent its rear edge to pivotally support a transversely extending rod 9 to which are secured a plurality of fore and aft extending rods 12 by means of stirrup members 13, each secured to a rod 12 as by bolts 14. The rods 12 are secured against lateral deflection by means of stirrup members 15 secured to the underface of platform 1 adjacent its forward edge which stirrups 15, while preventing lateral deflection permit the free rocking of the rods 12 each in a vertical plane. Each rod 12 carries a rearwardly and upwardly extending guide arm 17, the forward end of which is secured to the rod 12 a short distance back from its forward end and may desirably be stiffened by a web 18 adjacent its junction with the rod 12. The extreme forward ends 16 of the rods 12 are preferably flattened and bent upwardly to constitute runners adapted to contact the ground and able to freely rise and fall with the irregularities thereof by reason of the long radius of the rod 12 pivoted as it is adjacent the rear of the platform 1.

By reason of the structure this defined, it will be apparent that fallen grain or other plants will be lifted by the runners 16 passing under the same and the stems or stalks raised by the guide arm 17 to be brought thereby into substantially vertical position and then engaged by the reel 3. To more effectively assure the positioning of the severed grains with the heads positioned rearwardly paddles 6 may be adjustably secured on the slats 4, each paddle 6 being provided with a slot 7 and secured to the slat by a bolt 8. These paddles are arranged to pass between the spaced guide members 17 as illustrated and insuring the proper positioning of all stalks on the platform 1.

Various modifications in the construction and arrangement of parts will readily suggest themselves to those skilled in the art but within the scope of the invention as claimed.

What I claim is:

1. In a harvester having a platform, sickle bar and reel, a plurality of spaced parallel rods each freely pivoted at its rear end under and adjacent the rear edge of the platform and extending forwardly beyond the sickle bar with its forward end bent upwardly, with guide means carried by the platform engaging each of said rods intermediate its ends to restrict same against side play while permitting free motion in a vertical direction.

2. In a harvester having a platform, sickle bar and reel, a bar supported below, parallel with and spaced from the rear edge of the platform, a plurality of rods each having on its rear end a stirrup pivotally embracing the bar, a plurality of U-shaped guides supported by the platform adjacent the sickle bar one for each of the pivoted rods, restricting said rods to motion in parallel vertical planes, each of said rods extending forwardly of the sickle bar and having secured thereto adjacent its forward end, an upwardly and rearwardly extending guide rod, the ends of said rods forwardly of the junction with said guide rods being bent upward to form runners.

3. In a harvester of the type having a platform, sickle bar and slats carried by a reel, a plurality of spaced parallel rods each freely pivoted at its rear end under and adjacent the rear edge of the platform, and extending forwardly beyond the sickle bar, each of said rods having a rearwardly and upwardly directed guide rod extending from adjacent its forward end to a point under the reel, said pivoted rods having their ends forward of the junction with the guide rods bent upwardly to form runners, means restricting the pivoted rods to motion in a vertical direction and paddles adjustably positioned on the reel slats adapted to sweep the area intermediate the guide rods.

WALTER G. GRIMES.